United States Patent
Sullivan et al.

(10) Patent No.: US 10,712,913 B2
(45) Date of Patent: Jul. 14, 2020

(54) EVENT-BASED ARCHITECTURE FOR EXPAND-COLLAPSE OPERATIONS

(71) Applicant: Oracle International Corporation, Redwood Shores, CA (US)

(72) Inventors: Blake Sullivan, Redwood City, CA (US); Max Starets, Lexington, MA (US); Chadwick Chow, Lexington, MA (US); Hendrick van den Broek, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 530 days.

(21) Appl. No.: 14/657,688

(22) Filed: Mar. 13, 2015

(65) Prior Publication Data

US 2016/0110055 A1      Apr. 21, 2016

Related U.S. Application Data

(60) Provisional application No. 62/066,304, filed on Oct. 20, 2014.

(51) Int. Cl.
*G06F 3/0484* (2013.01)
*G06F 40/166* (2020.01)
(Continued)

(52) U.S. Cl.
CPC .......... *G06F 3/0484* (2013.01); *G06F 3/0481* (2013.01); *G06F 3/04812* (2013.01);
(Continued)

(58) Field of Classification Search
CPC ........... G06F 17/30961; G06F 3/04817; G06F 3/0482; G06F 3/04842; G06F 3/0484;
(Continued)

(56) References Cited

U.S. PATENT DOCUMENTS 6,102,965 A * 8/2000 Dye ................... G05B 19/0426
707/999.01
6,128,016 A * 10/2000 Coelho ................... G06F 3/033
707/999.102

(Continued)

*Primary Examiner* — Nicholas Ulrich
(74) *Attorney, Agent, or Firm* — Kilpatrick Townsend & Stockton LLP

(57) ABSTRACT

Techniques are disclosed for event-based architectures for implementing expand-collapse input-output operations in user interfaces. Certain techniques are disclosed herein that allow for a expand and/or collapse functionality via passing asynchronous events to a datasource module, which may or may not be routed through a view module. The datasource module determines what data is to be shown or hidden and issues an insert/delete event back to the view module. The insert/delete event may include additional data to be inserted into the user interface, and may include an identifier of where, within the displayed user interface, data is to be inserted or deleted. A view module may be configured to receive insert or delete events, and, in response, cause the user interface to be modified based upon the event. The view module may perform these updates by inserting or removing Document Object Model (DOM) nodes from a DOM associated with the user interface.

14 Claims, 10 Drawing Sheets

(51) Int. Cl.
*G06F 3/0481* (2013.01)
*G06F 16/00* (2019.01)

(52) U.S. Cl.
CPC .......... *G06F 3/04842* (2013.01); *G06F 16/00* (2019.01); *G06F 40/166* (2020.01)

(58) Field of Classification Search
CPC .... G06F 3/0481; G06F 40/18; G06F 3/04812; G06F 40/166; G06F 16/00
See application file for complete search history.

(56) References Cited

U.S. PATENT DOCUMENTS

| | | | | |
|---|---|---|---|---|
| 7,702,719 B1* | 4/2010 | Betz | ........................ | H04L 67/02 709/201 |
| 8,661,451 B1* | 2/2014 | Ramalingam | ........... | G06F 9/547 719/312 |
| 2002/0107892 A1* | 8/2002 | Chittu | ................... | G06F 3/0482 715/255 |
| 2003/0028561 A1* | 2/2003 | Gounares | ............... | G06F 40/166 715/234 |
| 2003/0063134 A1* | 4/2003 | Lord | ................... | G06F 17/30961 715/853 |
| 2004/0172592 A1* | 9/2004 | Collie | ................. | G06F 17/2229 715/212 |
| 2006/0200535 A1* | 9/2006 | Moser | ................... | G06F 9/4445 709/217 |
| 2008/0162532 A1* | 7/2008 | Daga | ..................... | G06F 16/248 |
| 2008/0163166 A1* | 7/2008 | Raman | ...................... | G06F 8/20 717/107 |
| 2010/0205206 A1* | 8/2010 | Rabines | ............ | G06F 17/30554 707/769 |
| 2011/0126210 A1* | 5/2011 | Rivard | ................... | G06F 9/451 718/108 |

* cited by examiner

FIG. 6

VIEW (E.G., TABLE, GRID) 114

| TASK NAME | RESOURCE | START DATE | END DATE |
|---|---|---|---|
| ◁ TASK 1 | LARRY | 1/1/2014 | 10/1/2014 |
| ◁ TASK 1-1 | LARRY | 1/1/2014 | 3/1/2014 |
| TASK 1-1-1 | LARRY | 1/1/2014 | 2/1/2014 |
| TASK 1-1-2 | LARRY | 2/1/2014 | 3/1/2014 |
| ◁ TASK 1-2 | LARRY | 3/1/2014 | 6/1/2014 |
| TASK 1-2-1 | LARRY | 3/1/2014 | 5/1/2014 |
| TASK 1-2-2 | LARRY | 5/1/2014 | 6/1/2014 |
| TASK 1-3 | LARRY | 6/1/2014 | 8/1/2014 |
| TASK 1-4 | LARRY | 8/1/2014 | 10/1/2014 |
| ▷ TASK 2 | LARRY | 4/1/2014 | 12/1/2014 |
| ▷ TASK 3 | LARRY | 5/1/2014 | 11/1/2014 |
| TASK 4 | LARRY | 11/1/2014 | 12/1/2014 |

AFFORD. 118

NODES 608

"PARENT" DATA 602

ADDITIONAL "CHILD" DATA 604

600

EVENT-BASED ARCHITECTURE FOR EXPAND-COLLAPSE OPERATIONS

CROSS-REFERENCES TO RELATED APPLICATIONS

The present application is a non-provisional of and claims the benefit and priority under 35 U.S.C. 119(e) of U.S. Provisional Application No. 62/066,304 filed Oct. 20, 2014, entitled EVENT-BASED ARCHITECTURE FOR EXPAND-COLLAPSE OPERATIONS, the entire contents of which are incorporated herein by reference for all purposes.

FIELD

Embodiments relate to the field of computing systems; and more specifically, to event-based application architectures for implementing expand-collapse operations.

BACKGROUND

One popular conceptual architectural framework used when designing and developing computing applications is referred to as the Model-View-Controller (MVC) architecture. An MVC architecture, which may be thought of as a design pattern, typically separates components of an application into three entities—a model, a view, and a controller—so as to separate "internal" representations of information from the various ways that information may be presented to and/or accepted from an end user. The MVC architecture may allow developers to reduce the programming effort to design systems that include multiple views and/or interactions with the same underlying data.

One component of the MVC architecture is the model, which defines the behavior of the application in terms of its problem domain, and is typically completely (or mostly) independent from the user interface. The model directly manages the data, logic, and rules of the application. Another MVC component is the view, which can involve any outputted representation of information, such as a chart or a diagram. The third MVC component is the controller, which typically accepts input and converts the input to commands for the model or view. In addition to dividing MVC-based applications into three kinds of components, the MVC also defines the interactions between these components.

For example, a controller may send commands to the model to update the model's state, and may also send commands to an associated view to change the view's presentation of the model. As another example, a model may notify its associated view(s) and controller(s) when there has been a change in its state, which can allow the view(s) to generate updated output and/or the controller(s) to change the available set of commands. Additionally, a view may request information from the model that it uses to generate an output representation to the user.

Some architectural frameworks allow developers to make use of "widgets." Widgets are software components that allows information to be programmatically displayed and/or provide user interpretable information. Widgets may include, for example, buttons, icons, scroll bars, drop-down menus, etc. Widgets are typically used to both provide information via graphical user interfaces (GUIs) for communicating between a program and a user, and possibly receive user input allowing the user to somehow manipulate the displayed information. The term widget may also, depending upon the context, be used to represent a software module (e.g., a relatively "small" program) that describes the user-perceived widget.

Since the advent of the MVC architecture, other similar architecture have been developed, including Hierarchical Model-View-Controller (HMVC), Model-View-Adapter (MVA), Model-View-Presenter (MVP), Model-View-View-Model (MVVM), etc. All of these approaches attempt to separate different kinds of logic through the concept of modularity, in an attempt to minimize the need for large, all-encompassing code rewrites and allow for rapid and simplified updates and further development. For purposes of this discussion, reference to "MVC" architectures may generally also include these other approaches, unless indicated by the surrounding context of use.

In practice, many development environments and/or frameworks employing MVC-type architectures do not allow result in the desired efficient, modular, and non-duplicated code. For example, despite the original intention of the MVC approach, applications using MVC architecture still typically suffer from some code redundancy—especially when widgets are utilized—and "bleeding" when some model-type code might find its way into view or controller code, for example. This can make an application's code base swell in size, become difficult to understand and review, and can lead to the application becoming non-performant.

Accordingly, effective and intuitive techniques for architecting and generating software applications with user interfaces are always strongly desired.

BRIEF SUMMARY

The present disclosure relates generally to computing systems and user interfaces; and more specifically, to event-based architectures for implementing expand-collapse operations in user interfaces. Certain techniques are disclosed herein that allow for a user interface of an application including expand and/or collapse (or "show and/or hide") functionality to be constructed such that the user initiation (or selection) of an expand or collapse operation is passed as an asynchronous event to a datasource module. In some embodiments, this event may be "passed through" (i.e., forwarded on without substantive processing by) a view module responsible for managing the user interface, but in some embodiments this event is directly passed to the datasource module and thus is effectively routed "around" the view module.

According to some embodiments, the datasource module determines what data is to be shown or hidden (i.e., expanded or collapsed) and issues an insert event or a delete event back to the view module. In some embodiments, an insert event may include additional data to be inserted into the user interface responsive to an expand event generated by a user interface responsive to a user indication of a desired expansion. In some embodiments, an insert event or delete event may include an identifier of where, within the displayed user interface, data is to be inserted or deleted. In some embodiments, an insert or delete event may include JSON-formatted data.

In some embodiments, a view module is configured to receive insert or delete events from a datasource, and, in response, cause the user interface to be modified based upon the insert or delete event. For example, in some embodiments the view module registers a request to receive insert or delete events, and upon such an event, the view module is notified of the event and processes the corresponding event data (e.g., determines the type of event, identifies associated data such as "additional" data to be inserted and/or a user interface location identifier such as a row or node identifier). Accordingly, in some embodiments the view module is configured to cause a user interface to be updated according to the insert or delete event. In some embodiments, the view module performs these updates by inserting or removing Document Object Model (DOM) nodes from a DOM associated with the user interface.

Thus, in some embodiments, the system is configured such that expand or collapse events triggered from a user selection in a view (or user interface or region) may cause that same view to be updated via expand/collapse events sent to a datasource module.

However, in some embodiments, the system may be configured such that expand or collapse events triggered from a user selection in one view may cause a separate view to be updated via expand/collapse events. For example, in some embodiments, a user interface element in a first view (which allows the user to initiate an expansion/collapse) may be configured to cause an expand/collapse event to be routed to a datasource module associated with the second view. This datasource module may then send an insert/delete event to a second view module associated with the second view, which in turn will update the second view accordingly.

Accordingly, embodiments provide several features such a tremendous simplification of view module code for an application. For example, in some embodiments, view modules do not need to be concerned with managing complex view data, determining how to acquire any additional data, wait for the additional data (e.g., from a datasource module), and then upon receipt of the additional data determine how to transform it and then update the view. Instead, to support expand/collapse operations, the view modules may only need to receive (or detect) insert or delete events generated by one or more datasource modules and update the view(s) accordingly. This can enable much more well-organized, modular, and maintainable code, as heavily interface-specific view module code is not required to be developed.

Additionally, embodiments may allow such expand/collapse operations to occur asynchronously, and thus a user selection/initiation of an expand/collapse operation may not cause the view module—which manages the view itself—to "block" as it waits for requested data. Thus, the user interface(s) may be further manipulated or otherwise interacted with by the user—through use of the view module—while the "backend" expand/collapse operations are occurring (e.g., the "slow" data retrieval and manipulation by the datasource module) because the view module does not block.

The foregoing, together with other features and embodiments will become more apparent upon referring to the following specification, claims, and accompanying drawings.

BRIEF DESCRIPTION OF THE DRAWINGS

FIG. 6 illustrates a view including affordances and additional "child" data resulting from an expand operation generated by the selection of an affordance associated with "parent" data according to some embodiments.

DETAILED DESCRIPTION

Figure 1:
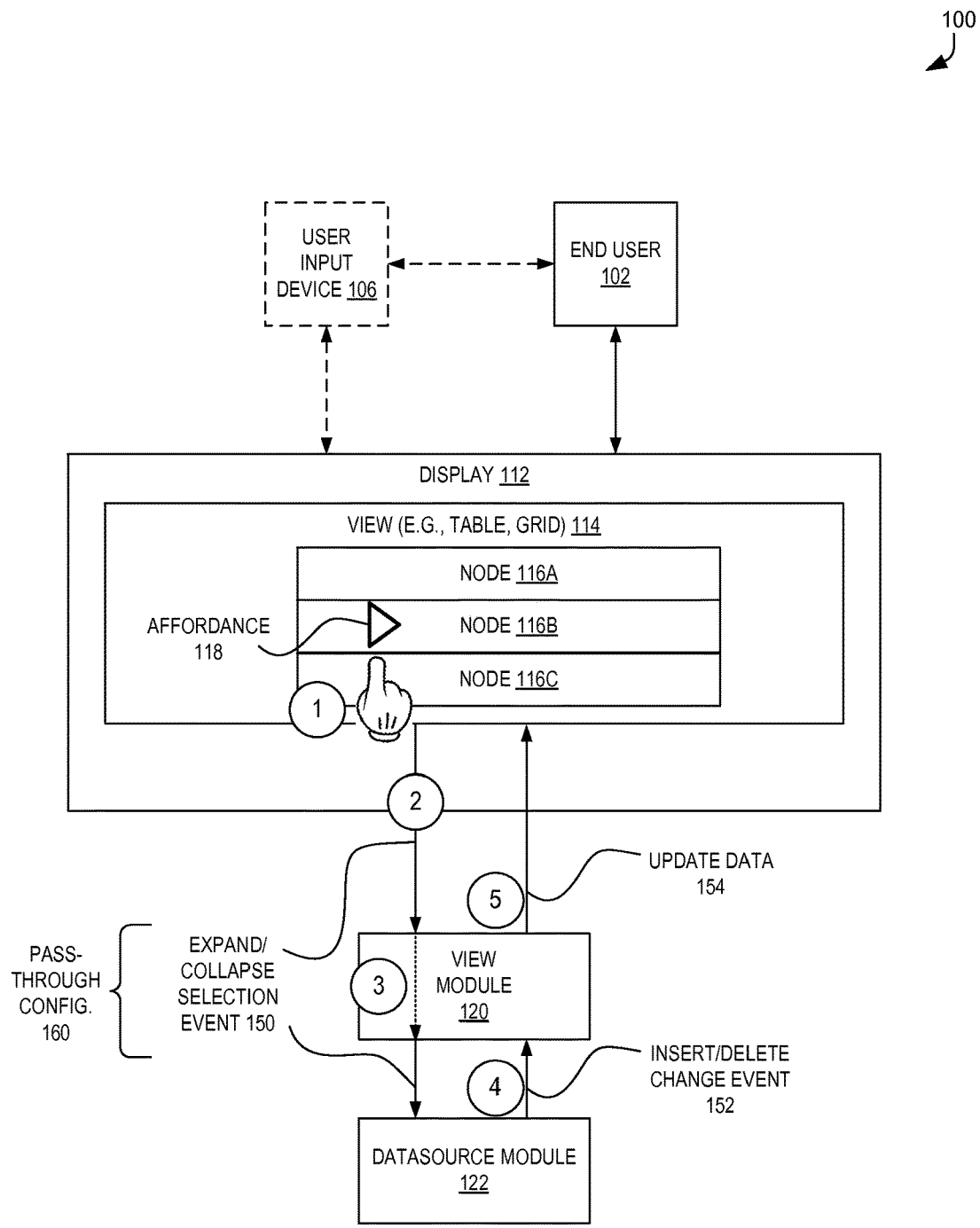
FIG. 1 illustrates a simplified high level block diagram and conceptual overview of a system utilizing an event-based architecture for expand-collapse operations and exemplary processing for an expand/collapse selection event with a pass-through view module according to some embodiments.

In the following description, for the purposes of explanation, specific details are set forth in order to provide a thorough understanding of these embodiments. However, it will be apparent that various embodiments may be practiced without these specific details. The figures and description are not intended to be restrictive.

The present disclosure relates generally to computing systems and user interfaces; and more specifically, to event-based architectures for implementing expand-collapse operations in user interfaces. Certain techniques are disclosed herein that allow for a user interface of an application including expand and/or collapse (or "show and/or hide") functionality to be constructed such that the user initiation (or selection) of an expand or collapse operation is passed as an asynchronous event to a datasource module. In some embodiments, this event may be "passed through" (e.g., forwarded on, without substantive processing by) a view module responsible for managing the user interface, but in some embodiments this event is directly passed to the datasource module and thus is effectively routed "around" the view module.

According to some embodiments, the datasource module determines what data is to be shown or hidden (i.e., expanded or collapsed) and issues an insert event or a delete event back to the view module. In some embodiments, an insert event may include additional data to be inserted into the user interface responsive to an expand event generated by a user interface responsive to a user indication of a desired expansion. In some embodiments, an insert event or delete event may include an identifier of where, within the displayed user interface, data is to be inserted or deleted. In some embodiments, an insert or delete event may include JSON-formatted data.

In some embodiments, a view module is configured to receive insert or delete events from a datasource, and, in response, cause the user interface to be modified based upon the insert or delete event. For example, in some embodiments the view module registers a request to receive insert or delete events, and upon such an event, the view module is notified of the event and processes the corresponding event data (e.g., determines the type of event, identifies associated data such as "additional" data to be inserted and/or a user interface location identifier such as a row or node identifier). Accordingly, in some embodiments the view module is configured to cause a user interface to be updated according to the insert or delete event. In some embodiments, the view module performs these updates by inserting or removing Document Object Model (DOM) nodes from a DOM associated with the user interface.

Accordingly, in some embodiments the view module listens for a expand/collapse operation, and informs the datasource of the expand/collapse operation. The datasource module, in response, can send an insert or delete event to the view.

Following this approach, the datasource module can react asynchronously, and thus, the view can be very simple, computationally-efficient, and easy to maintain as it (i.e., the view module) only needs to listen to insert and delete events.

Additionally, embodiments can improve the perceived performance of an application as the view module can give control back to the application (for other processing) while waiting for the asynchronous datasource event.

Moreover, in embodiments the view module is easier to maintain, and this configuration can flexibly allow datasource modules to react differently to the insert/delete operations.

From a high level, embodiments utilize a view module that can display lists of data, and the view module may register itself as a listener for data events (e.g., expand/collapse events) from the datasource module it displays data for. Thus, the view module can handle the expand/collapse operations itself, or another UI widget (e.g., an affordance) can be delegated to capture the user's expand/collapse operations, which are then passed on to the datasource module that will respond with insert and/or delete operations.

Embodiments are particularly well-suited for displaying hierarchical data, which is complex for traditional view module code to manipulate efficiently and effectively due to potentially large numbers of elements that are nested at various levels of the hierarchies.

In some embodiments, the view module need not even be aware of the affordances used to generate expand/collapse events, and thus the affordance may be an independent item that an application developer can place anywhere in a view. Accordingly, the view does not need to know about the affordance and its ability (or lack thereof) to handle an expand/collapse operation. Thus, one underlying affordance can be provided that can be used in multiple views (e.g., tables, grids) that can provide user interface consistency across multiple views that utilize expand/collapse behavior, prevent code duplication across multiple views (e.g., tables, grids), and let the view module leverage its efficient insert/delete functionalities for traditional view updates for "collapse" and "expand" scenarios as well.

Thus, in some disclosed embodiments, a datasource module manages displayed data that has multiple rows, where some rows are child rows of a parent row (which can be multiple levels), a view module displays the rows, and an affordance (a "row expander", for example) depicts the expand/collapse state and handles the expand and collapse user selections. Thus, in some embodiments the view module may be initialized with the datasource module (e.g., interact with the datasource module to receive the data to be displayed) and renders the data. An application developer may have previously decided in which column of a view the affordance is to be placed, and it may be rendered accordingly, and acquire a "context" from the view identifying the location (e.g., the particular row) where the affordance is placed, and determines whether it should be displayed in an expanded or collapsed state.

In some embodiments, an affordance named a "row expander" may be utilized, which is an affordance that can be placed within a cell (e.g., of a grid within a view) or a column (e.g., of a table within a view)—perhaps directly within HTML markup—that allows users to expand and collapse a row of the grid/table. As described above, the row expander may be configured to identify its location during the initialization as a context value, such as an identifier of the row, column, grid/table where it exists within the view. The row expander may be configured by the developer with an associated datasource, or the row expander may be configured to self-identify its associated datasource based upon its location within a view, such as by detecting a datasource associated with a view/grid that it is placed within.

After this initialization, in some embodiments the user can click (or otherwise select) the affordance to expand to row (i.e., fire an "expand" event), causing the affordance to call the datasource module (directly or indirectly through the view module) seeking an expand operation. This fired event may include an identifier of the node or row (or, the "context" of the affordance/row expander) in which the operation is to occur.

Further, in some embodiments the event message may include an indentation level identifier that indicates a display offset for the affordance or additional data.

In response, the datasource module may then retrieve and format the to-be-expanded rows (e.g., perform a query to retrieve the necessary children nodes), and send the view module an insert event with this data. The view module may then update itself accordingly, and cause the additional child rows to be displayed.

Similarly, for a collapse operation the affordance will send a collapse event to the datasource module (again, directly or indirectly through the view module), which in turn will send a delete event to the view, which removes the child/children from the view.

FIG. 1 illustrates a simplified high level block diagram and conceptual overview of a system 100 utilizing an event-based architecture for expand-collapse operations and exemplary processing for an expand/collapse selection event with a pass-through view module configuration 160 according to some embodiments. FIG. 1 depicts an end user 102, an optional user input device 106, a display 112 depicting a view 114, a view module 120, and a datasource module 122.

The view 114 of FIG. 1 comprises a user interface that is displayed view display 112. The view 114 may be any combination of one or more user interface elements, and may include one or more of a table, grid, set of rows, list, etc. In the depicted embodiment, the view 114 includes three nodes 116A-116C. As an example, each of the three nodes 116A-116C may be a row of table or grid, an element in a list or menu, etc.

The second node 116B is illustrated as including an affordance 118. In some embodiments, an affordance 118 is an illustrated element (e.g., an icon or graphic, one or more text characters, a drawing, a picture, a video, etc.) that can be selected by the end user 102. This selection indicates the end user's 102 desire to interact with the view 114 and/or the associated node 116B. In some embodiments, an affordance 118 is provided to allow the user to interact with hierarchical data (e.g., view different levels of a menu, view different nodes of a tree data structure).

In the depicted example, the affordance 118 comprises a graphic of a triangle that, when selected by the end user 102, will cause additional data associated with the associated node 116B to be either shown or hidden. For example, as illustrated the end user 102 may click or otherwise select the affordance 118 to cause additional data associated with the node 116B to be shown. In some embodiments, the visual representation of the affordance 118 (i.e., the triangle) may be modified based upon this selection; for example, the affordance 118 may be rotated (e.g., rotated 90 degrees such that the arrow now points downward) or otherwise modified (e.g., change of color, position, size, shape, replace the graphic, etc.). Of course, many other modifications known to those of skill in the art may similarly be made to the affordance 118 and/or view 114 to indicate the selection to the end user 102.

In some embodiments, when the affordance 118 is selected a subsequent time, an "opposite" or "complementary" event may be triggered. For example, if the end user 102 had first selected the affordance 118 to cause an "expand" event, a subsequent selection may cause a "collapse" event to be triggered.

Accordingly, the affordance 118 may be in a "state" that identifies whether, upon its selection, it will cause an expansion (e.g., an "expand state") or a removal (e.g., a "collapse state") of data in the view via an expand selection event or a collapse selection event.

For example, at circle '1' we assume (for purposes of this illustration) that the end user 102 has selected (e.g., by clicking, tapping, or using some other user input hardware) the affordance 118 associated with the second node 116B. In some embodiments, the affordance 118 may be viewed as a "widget" and thus comprises both the displayed user interface element (e.g., a triangle) as well as some associated code (e.g., JavaScript) for modifying the affordance and/or generating event data—however, this is not required in all embodiments.

Thus, upon this selection at circle '1', the affordance 118 causes an expand/collapse selection event 150 to be generated at circle '2'. This may include generating an event that one or more other components, such as the view module 120, may "register" for.

In some embodiments, the view module 120 is configured to receive (e.g., register to receive certain events, be notified by another software module, operating system component, etc.) events of a particular type, such as expand/collapse selection events 150. In some embodiments, various modules may monitor an event log (or shared memory), and thus the selection of the affordance 118 may cause an event indicator to be placed in an events log (or shared memory), and the view module 120 may thus "detect" the event. In some embodiments, though, the expand/collapse selection events 150 may comprise messages from the affordance 118 directed toward the view module 120.

Accordingly, this depicted embodiment of FIG. 1 illustrates a "pass-through" system configuration 160 in which the view module 120 is configured as a "pass-through" for expand/collapse selection events 150, and thus, the view module 120 will receive or otherwise detect (at circle '3') expand/collapse selection events 150, and "pass" them through the view module 120 unchanged (or with only relatively minor modifications, which may not be substantive but instead related to formatting, for example) toward a datasource module 122.

In some "pass-through" embodiments, the view module 120 is configured to pass all such expand/collapse selection events 150 to a common datasource module 122. However, in other pass-through embodiments, the view module 120 may "route" the expand/collapse selection events 150 to a particular datasource module 122 (possibly of many such datasource modules 122).

For example, the view module 120 may be configured to route the expand/collapse selection events 150 to particular datasource modules based upon data (e.g., an identifier of the recipient datasource module, the affordance 118, the associated node 116B, and/or the view 114) within the expand/collapse selection events 150, which may indicate which datasource module 122 is suited to handle the event. Alternatively, in some embodiments the view module 120 may be configured to route all requests from a particular affordance 118, view 114, or display 112 to a particular datasource module 122.

Upon receipt of an expand/collapse selection event 150, the datasource module 122 analyzes the expand/collapse selection event 150 to determine how to proceed.

In some embodiments, when the expand/collapse selection event 150 comprises a "collapse" event, the datasource module 122 may transmit an insert/delete change event 152 (e.g., a delete change event 152) to the view module 120 at circle '4'.

In some embodiments, when the expand/collapse selection event 150 comprises an "expand" event, the datasource module 122 may be configured to identify, based upon the data of the expand/collapse selection event 150, which affordance 118 or associated node 116B the particular expand/collapse selection event 150 is associated with. For example, the data of the expand/collapse selection event 150 may include an affordance identifier value and/or a node (or row, etc.) identifier, either of which may be used by the datasource module 122 as an index or key to determine which additional data is being requested.

In the depicted embodiment, the selection of the affordance 118 may indicate a request to view "child nodes" in a hierarchy of nodes of the selected second node 116B. However, in some embodiments, the additional data may be other types of non-hierarchical data.

Thus, in some embodiments, the datasource module 122 may retrieve the additional data using, for example, a locally-stored or remotely retrieved data structure (e.g., JSON data), an object, a database, filesystem, or other data structure. As one example, the additional data may be provided within a JSON file including hierarchical data such as:

```
[
    {"attr": {"id": "t1",
            "name": "Task 1",
            "resource": "Larry",
            "start": "1/1/2014",
            "end": "10/1/2014"
            },
    "children": [
            {"attr": {"id": "t1:1",
                    "name": "Task 1-1",
                    "resource": "Larry",
```

-continued

```
            "start": "1/1/2014",
            "end": "3/1/2014"
         },
         "children": [
            {"attr": {"id": "t1:1:1",
               "name": "Task 1-1-1",
               "resource": "Larry",
               "start": "1/1/2014",
               "end": "2/1/2014"
               }
            },
            {"attr": {"id": "t1:1:2",
               "name": "Task 1-1-2",
               "resource": "Larry",
               "start": "2/1/2014",
               "end": "3/1/2014"
               }
            }
         ]
      }
...
```

As another example, the datasource module 122 may perform a SQL query to retrieve data for the "child nodes" of the second node 116B. In an embodiment, the datasource module 122 acquires this data and sends an insert change event 152 based upon this data.

The datasource module 122, in some embodiments, is configured with an identifier of a hierarchical data source—such as a variable, a set of rows, a table, a database, etc.—providing the data for the view.

In some embodiments, the datasource module 122 is configured with a default or maximum number of data items (e.g., "rows") that it will fetch at one time for one "expand" event. Thus, in some embodiments where more data exists (e.g., 70 rows) than the configured default/maximum number of data items that can be fetched (e.g., 25 rows), the datasource module 122 may initially return rows 1-25 upon receipt of a first "expand" event, return rows 26-50 upon receipt of another "expand" event (triggered by an affordance, or a user scrolling to a bottom of the first 25 rows, for example), etc.

In some embodiments, the datasource module 122 is configured to convert retrieved data from a hierarchical data structure (e.g., that stores the requested hierarchical data) into a format that is "flat." For example, the datasource module 122 may convert hierarchical data (see, e.g., the hierarchical JSON sample provided herein) into a non-hierarchical format (e.g., a set of rows). This data is returned, by the datasource module 122, within an insert event 152 to the view module 120.

For example, the datasource module 122 in some embodiments sends JavaScript Object Notation (JSON) formatted data including the retrieved data back to the view module 120 as part of an insert event 152 (responsive to the fired "expand event"). Thus, the view module 120 only needs to use well-known, straightforward data manipulation logic to understand the data being returned in the insert event 152 and convert it into view update data 154 (e.g., DOM objects, HTML, etc.) for updating the view 114.

As described above with respect to expand/collapse selection events 150, the view module 120 may similarly register for insert/delete change events 152, monitor an event log or a shared memory for these events, receive function calls, etc. In some embodiments, the insert/delete change event 152 comprises an identifier of the event, an event type of the event, a target location identifier, and/or event data. For example, a delete change event 152 may include one or more target location identifiers that identify which user interface elements are to be removed from the view 114. As another example, an insert change event 152 may include event data that stipulates what data is to be inserted into the view 114 and may further include a target location identifier of where within the view 114 this data is to be inserted.

After receiving and parsing the insert/delete change event 152, the view module 120 may use well-known techniques to modify the view 114 accordingly. For example, at circle '5', the view module 120 may send update data 154 to the view 114. For example, in an embodiment where the view 114 is constructed using HTML or HTML-type technologies, the view module 120 may cause one or more DOM elements to be added or removed, which may occur using JavaScript, for example. In other embodiments, the view module 120 may use user interface library calls to add or remove elements from the view 114. For example, the view module 120 may, for an insert change event 152, insert one or more nodes into a tree data structure to cause the display of the tree (as nodes 116A-116C) to be refreshed/redrawn.

Figure 2:
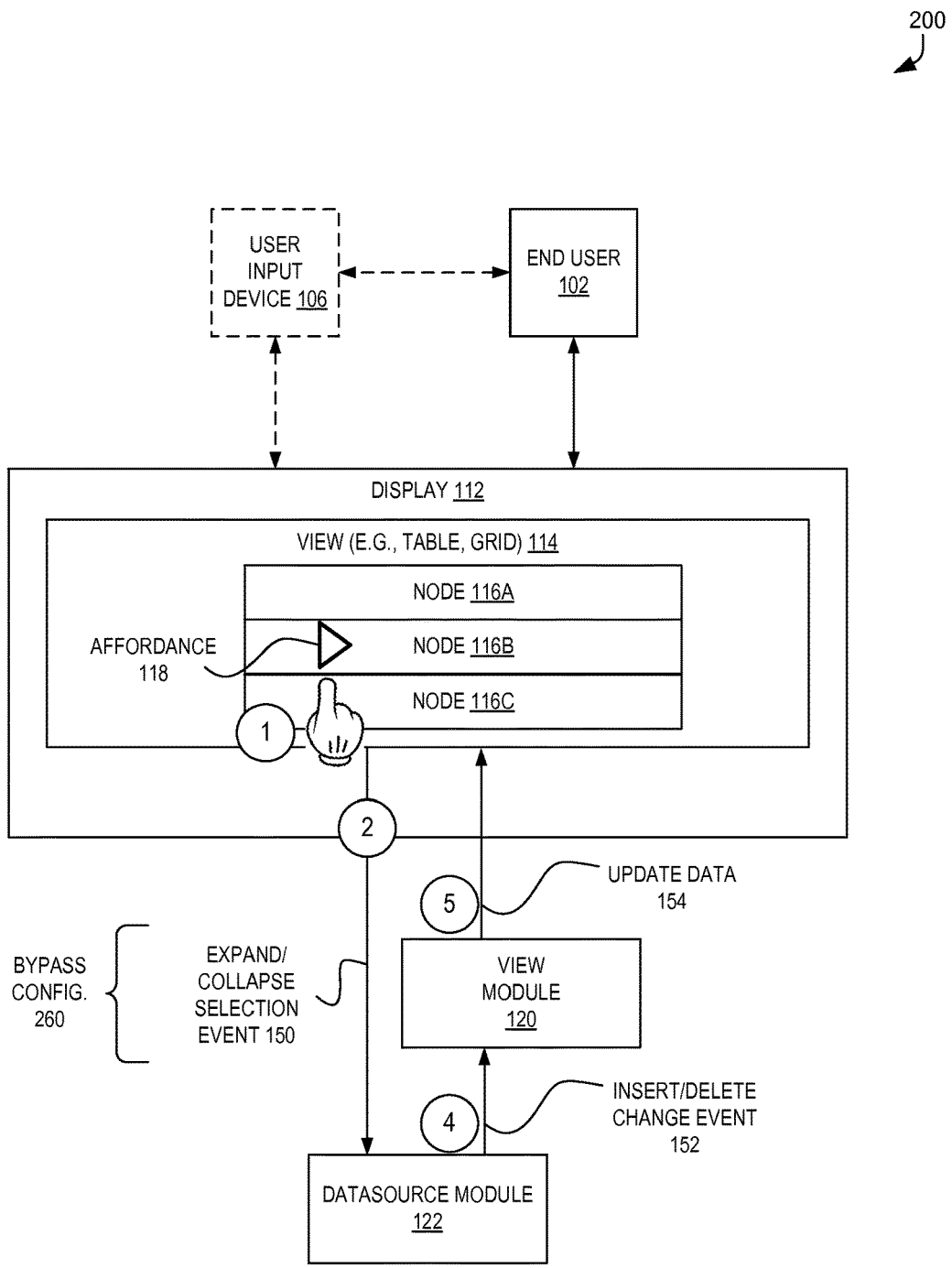
FIG. 2 illustrates a simplified high level block diagram and conceptual overview of a system utilizing an event-based architecture for expand-collapse operations and exemplary processing for an expand/collapse selection event with a bypassed view module according to some embodiments.

Having presented a configuration where the view module 120 is configured as a pass-through module, we now present another configuration according to other embodiments. FIG. 2 illustrates a simplified high level block diagram and conceptual overview of a system 200 utilizing an event-based architecture for expand-collapse operations and exemplary processing for an expand/collapse selection event with a "bypassed" view module configuration 260 according to some embodiments.

The operations of FIG. 2 are generally similar to those described with respect to FIG. 1; however, in this embodiment, the system employs a bypass configuration 260 such that the view module 120 does not receive and/or send expand/collapse selection events 150. (Note the lack of an illustrated circle '3'). Instead, the datasource module 122 directly receives the expand/collapse selection events 150. For example, in some embodiments the datasource module 122 registers to receive these events. In other embodiments, the affordance 118 is configured to direct these events directly to the datasource module 122. For example, the affordance 118 may be configured to generate API calls to the datasource module 122 to transmit the expand/collapse selection events 150 to the datasource module 122.

Thus, in some embodiments, the system is configured such that expand or collapse events triggered from a user selection in a view 114 (or user interface or region) may cause that same view 114 to be updated via expand/collapse events directed to a datasource module 122.

However, the system may be configured such that expand or collapse events triggered from a user selection in one view may cause a separate view to be updated via expand/collapse events. For example, in an embodiment a user interface element in the first view configured to allow the user to initiate the expansion/collapse of the second view may be configured to cause an expand/collapse event to be routed to a datasource module associated with the second view. This datasource module may then send an insert/delete event to a second view module associated with the second view, which in turn will update the second view accordingly.

Figure 3:
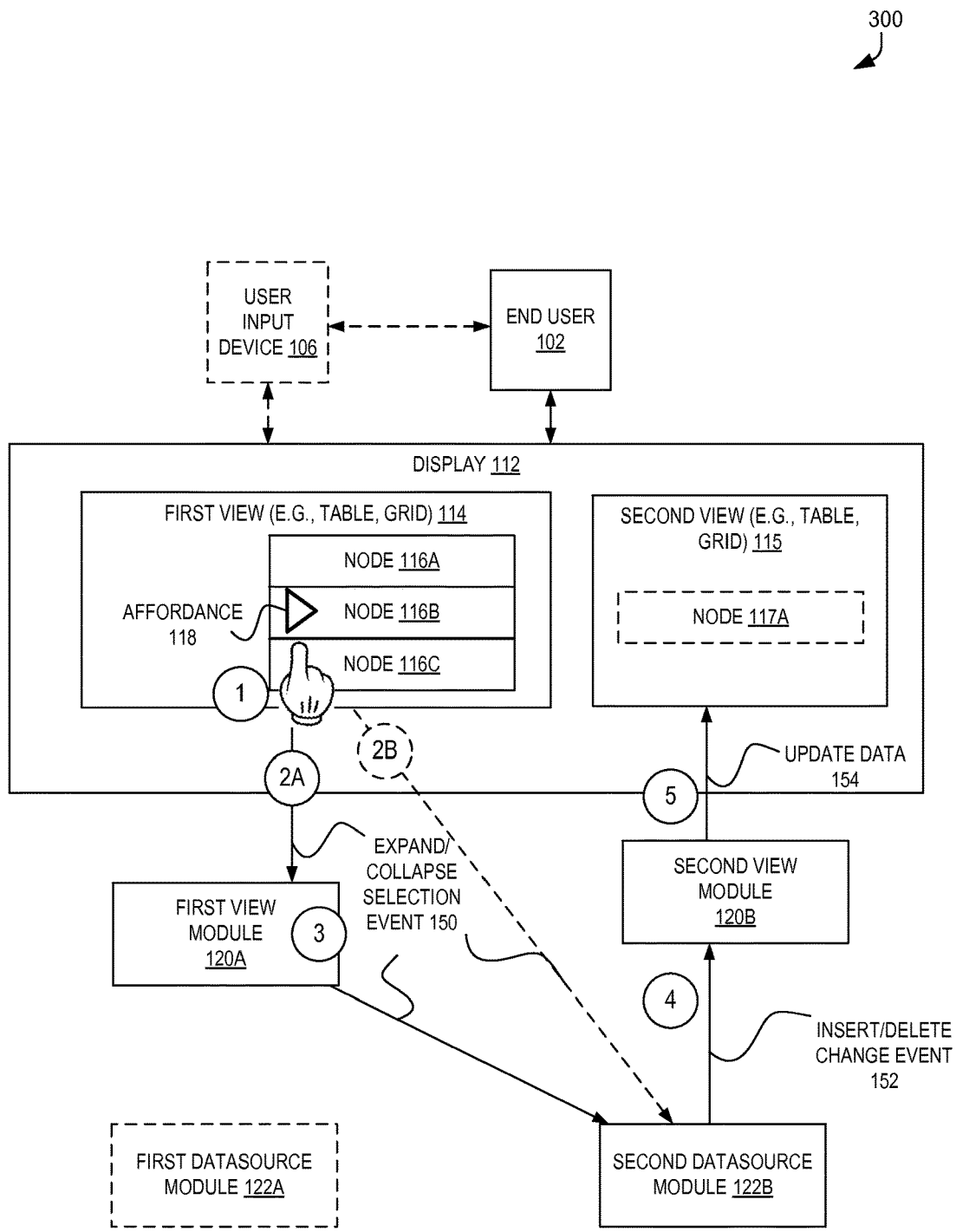
FIG. 3 illustrates a simplified high level block diagram and conceptual overview of a system utilizing an event-based architecture for multi-view expand-collapse operations and exemplary processing for an expand/collapse selection event occurring in a first view according to some embodiments.

As an example, FIG. 3 illustrates a simplified high level block diagram and conceptual overview of a system utilizing an event-based architecture for multi-view expand-collapse operations and exemplary processing for an expand/collapse selection event occurring in a first view according to some embodiments. FIG. 3 includes many of the same elements as depicted in FIG. 1 and FIG. 2; however, FIG. 3 also includes a second view 115, a second view module 120B, and a second datasource module 122B (the first view module 120A and first datasource module 122A have the letter 'A' appended for the sake of clarity).

For the sake of understanding, this configuration can be particularly useful for displaying a list of elements in one view (e.g., first view 114) and details associated with each of the elements in another view (e.g., a second view 115). For example, the first view 114 may illustrate a list of orders and the second view 115 may illustrate the details of a particular "selected" order (for food, merchandise, etc.), such as items and/or quantities thereof belonging to the selected order.

In this depicted embodiment, a user selection (e.g., at circle '1') of an affordance 118 associated with the second node 116B of the first view 114 may cause an expand/collapse selection event 150 to be directed, ultimately, to a second datasource module that is configured to manage the underlying data of a second view 115.

Thus, in the "pass-through" configuration (at circle '2A' and circle '3', see also FIG. 1), the first view module 120A may receive (or otherwise become aware of or be notified of) an expand/collapse selection event 150, and determine that the second datasource module 122B—as opposed to the first datasource module 122A—is suited to handle the event. For example, this may occur by the first view module 120A examining the expand/collapse selection event 150 itself—which may include an indicator of the particular datasource (i.e., the second datasource module 122B) or the target view (i.e., the second view 115) or target node (i.e., node 117A) Thus, the first view module 120 module may route the expand/collapse selection event 150 to the second datasource module 122B, which "handles" the expand/collapse selection event 150 as described above, and causes an insert/delete change event 152 to be passed to a second view module 120B associated with the second view 115, which then performs the second view update.

Similarly, in a "bypassed" configuration (as presented with regard to circle '2B' and related to concepts presented in FIG. 2), the first view module 120A may not be involved in handling the expand/collapse selection events 150. Thus, in some embodiments, the second datasource module 122 may register for expand/collapse selection events 150, and in some embodiments the affordance 118 may be configured to direct expand/collapse selection events 150 toward the second datasource module 122B. Of course, other affordances (not illustrated) in the first view 114 may simultaneously be configured to direct expand/collapse selection events 150 that require an update to the first view 114 toward the first datasource module 122A, which may occur via the first view module 120A (i.e., a pass-through configuration) or without the first view module 120A (i.e., in a bypassed configuration).

Further, some embodiments are not limited to only two views being involved. In some embodiments, expand/collapse selection events 150 may be generated within a view (e.g., first view 114) that target an update of a second view, third view, fourth view, fifth view, etc.

In some embodiments, the multi-view configuration depicted in FIG. 3 may not require multiple view modules and/or datasource modules. For example, in some embodiments only one view module (e.g., 120A) exists and manages multiple views (e.g., first view 114 and second view 115), and in some embodiments only one datasource module (e.g., 122A) exists and manages data operations for multiple views. In some of these configurations, the view module 120A and/or datasource module 122A are able to employ source identifiers (i.e., indicating which view that the event got triggered by) and/or target identifiers (i.e., which view needs to be updated) to determine the involved entities.

Figure 4:
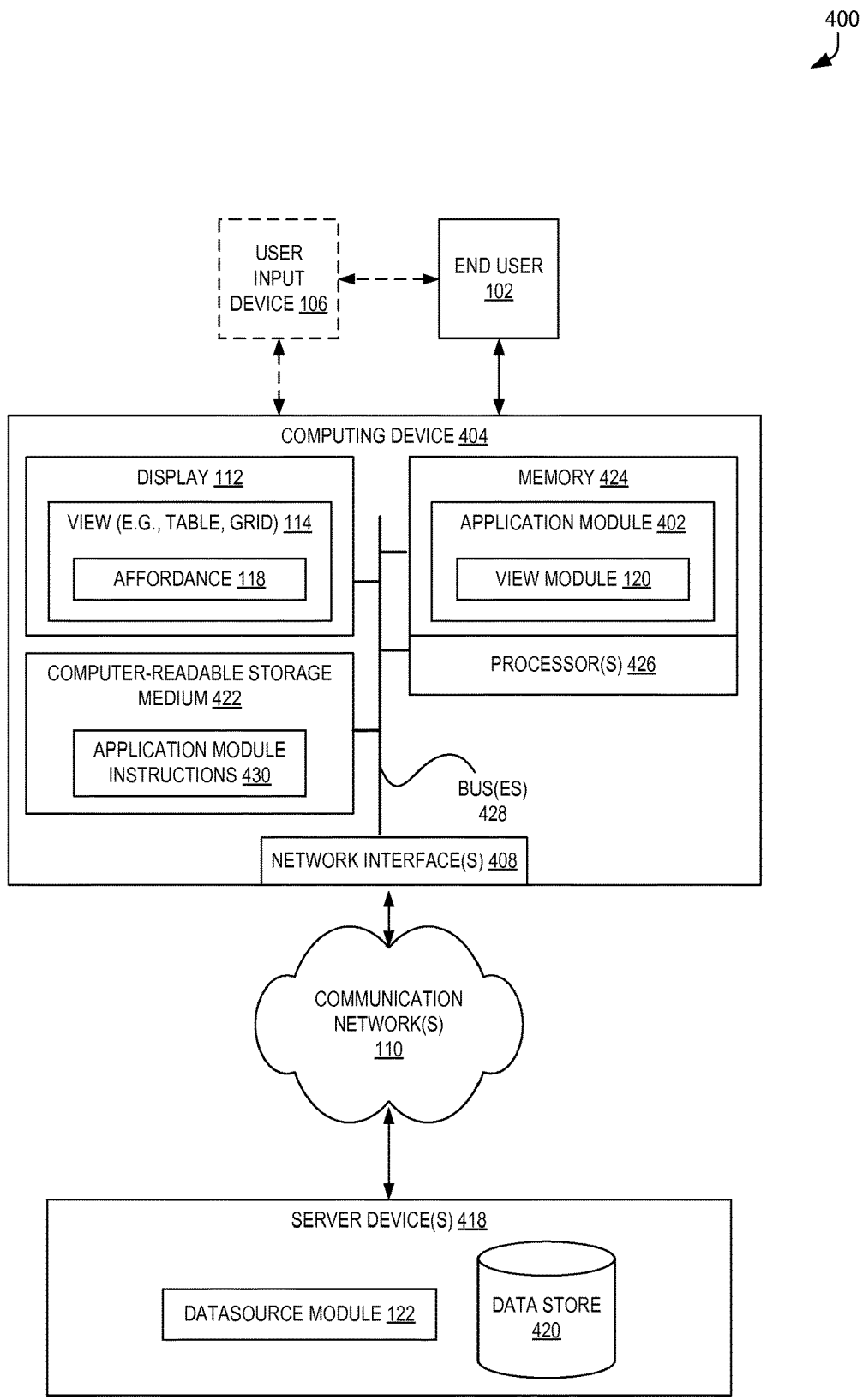
FIG. 4 illustrates a simplified diagram of hardware and software components in an event-based architecture for expand-collapse operations that may be used for implementing some embodiments.

FIG. 4 illustrates a simplified diagram of hardware and software components in an event-based architecture for expand-collapse operations that may be used for implementing some embodiments.

In FIG. 4, the view 114 is displayed by a display 112 of a computing device 404. The computing device 404, and other computing devices used in this system (e.g., server devices 418), may be of various different types including, but not limited to, personal computers (PCs), desktops, mobile or handheld devices such as laptops, mobile phones, tablets, etc., and other types of devices. In some embodiments, the display 112 is a part of the computing device 404, such as in embodiments where computing device 404 is a tablet, smartphone, kiosk, wearable computer or "all-in-one" PC. In other embodiments (not depicted) the display 112 may be a separate device from a computing device 404 that the end user 102 provides input to, and may comprise a television, monitor, or projector connected to a PC or other computer (e.g., a single-board computer such as a Raspberry Pi), laptop, media system, disc player (e.g., Blu-Ray or DVD), and the like. The computing device 404 may further comprise a memory 424, one or more processing units (or "processors") 426, a computer-readable storage medium 422, some or all of which may be coupled using one or more buses 428.

In FIG. 4, the view module 120 is part of or otherwise executed by an application module 402. The application module 402 may be any of many different types of applications that display data to users, such as a firmware software module of the computing device 404, an operating system application (or portion thereof), a user-space application, etc. For example, the application 402 may be a native application configured to be executed by a particular operating system, a portable application such as a Java-based application, a web browser, an application executed by a web browser, a video game, a word processing or office productivity application, presentation software, etc. Code for the application module 402 may be stored as application module instructions 430 on one or more computer-readable storage media 422.

In FIG. 4, the computing device 404 includes one or more network interfaces 408 for connectivity across one or more communication networks 110 with one or more server devices 418. In some embodiments, the data underlying the view(s) 114 is provided from a datasource module 122 of one or more (possibly remote) server devices 418. This data may be stored within one or more data structures (e.g., data store 420) and accessed by the server devices 418, such as flat files, databases, etc. In some embodiments, the datasource module 122 executed by the server devices 418 may transmit the data across one or more communication networks 110 to the computing device 404, which receives the data at its one or more network interfaces 408. Of course, in some embodiments no remote communications are utilized, and the data is stored at the computing device 404 (or at a computer-readable storage medium 422 of (or communicatively coupled with) the computing device 404) and "directly" accessed by the application 402.

In those embodiments including server devices 418, the one or more communication networks 110 facilitate communications between the computing device 404 and the server devices 418. The one or more communication networks 110 can include networks of various types, each possibly including one or more networking devices or equipment including but not limited to network switches, routers, bridges, load balancers, etc. Examples of one or more communication networks 110 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks 110 including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

Turning back to the computing device 404, as one example, the application module 402 may comprise a web browser that is configured to display the view 114 based upon code included within (or identified by) received webpages. A webpage typically comprises one or more types of code, including but not limited to HTML (HyperText Markup Language) code, CSS (Cascading Style Sheets) code, JavaScript code, etc., for instructing the browser how to present the webpage to the end user 102. The webpage itself may include additional URLs of additional resources (e.g., images, additional code, video), which are also retrieved by the browser. When the browser has retrieved all necessary resources, it "outputs" or "presents" the webpage by rendering some or all of the webpage, and displaying it via a display 112. Examples of browsers include without restriction various versions of Internet Explorer (IE) by Microsoft™, Safari by Apple™, Chrome by Google™, Firefox by Mozilla™, Opera by Opera Software ASA, and others. Of course, although this one example is presented with respect to browsers and webpages, in other embodiments other software applications are utilized as described above.

Once the view 114 has been output via the application module 402 (e.g., browser) on the computing device 404 display 112, the end user 102 of the computing device 404 may interact with the view 114 (and in particular, the affordance 118) in various ways using one or more input mechanisms provided by the computing device 404. These input mechanisms may be part of the computing device 404 (e.g., a touchpad, built-in keyboard, microphone, camera, or where the display 112 comprises a touch-enabled display) or an external user input device 106 connected to the computing device 404 (e.g., a mouse, a keyboard, a microphone, camera, etc.).

However, the system 400 of the embodiment depicted in FIG. 4 is merely one example and is not intended to unduly limit the claimed embodiments of the present invention. Thus, one of ordinary skill in the art would recognize many possible variations, alternatives, and modifications to this illustrated system 400.

Figure 5:
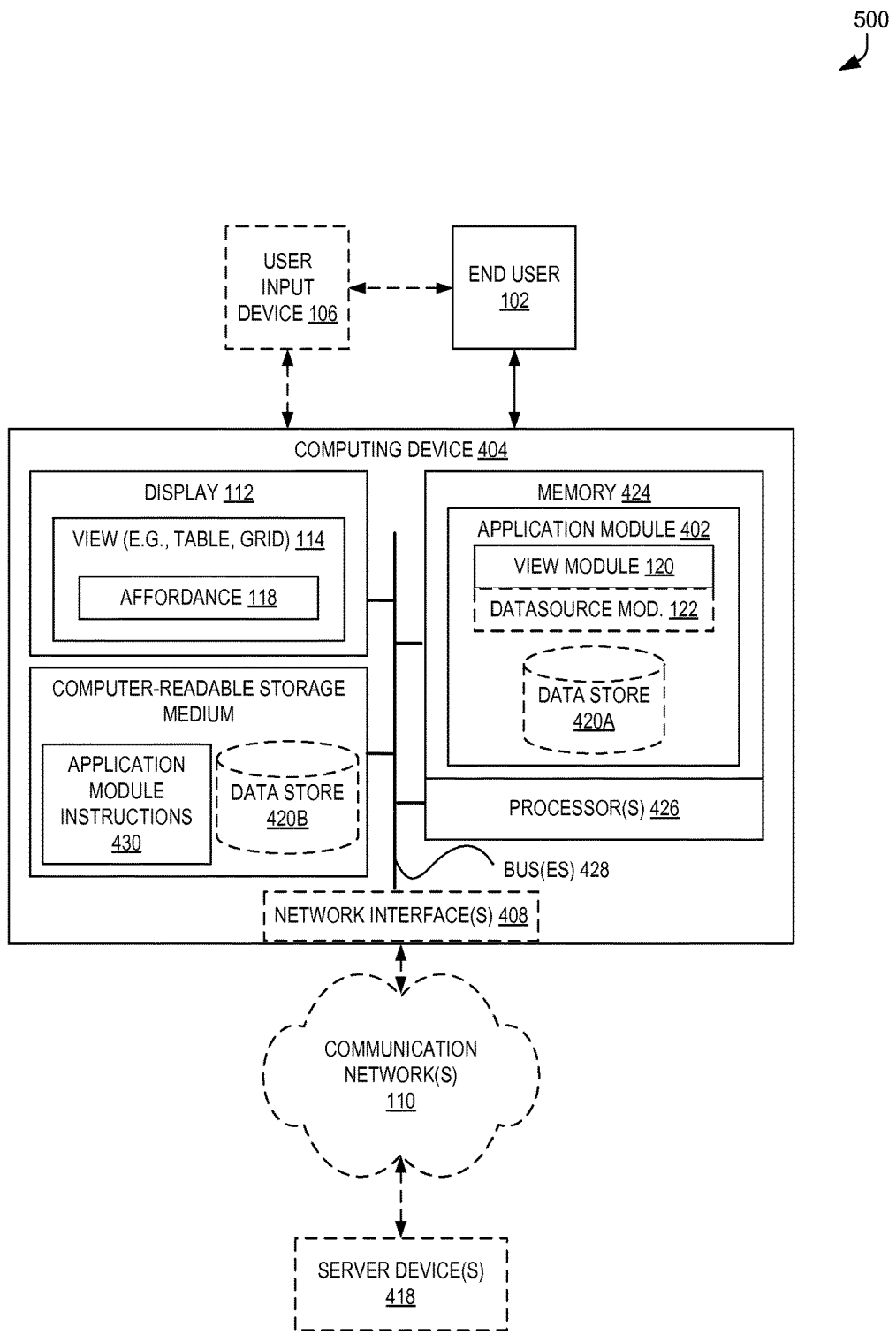
FIG. 5 illustrates another simplified diagram of hardware and software components in an event-based architecture for expand-collapse operations that may be used for implementing some embodiments.

As one of many examples of other alternatives, FIG. 5 illustrates another simplified diagram of hardware and software components in an event-based architecture for expand-collapse operations that may be used for implementing some embodiments.

In FIG. 5, the application module 402 may now include the datasource module and/or a data store 420A. (Alternatively, the data store 420B may be external to the application module 402 but still be provided by the computing device 404). Thus, this configuration may be viewed as more of a "standalone" application module 402 that may not require much, if any, connectivity to any remote server devices 418 over communication networks 110. However, in some embodiments the application module 402 may, for example, comprise a web browser or application that retrieves code for a page or application that includes code for the view module 120, code for the datasource module 122, and optionally the data store 420A data itself.

FIG. 6 illustrates a view including affordances 118 and additional "child" data resulting from an expand operation generated by the selection of an affordance associated with "parent" data according to some embodiments.

In an embodiment, the view 114 comprises a table or grid including multiple nodes 608. In this depiction, each node 608 is a row in the table, and the nodes together represent hierarchical data. For example, the depicted nodes 608 include a top-level of parent (or root) nodes including "Task 1" and "Task 2" and "Task 3" and "Task 4." In this depiction, each of these nodes (except "Task 4") is also a "parent" node having "children" nodes, as indicated by an affordance (i.e., a triangle) overlaid on each node.

Thus, some nodes of the sub-tree for "Task 1" are illustrated, and "Task 1" is shown to have four direct child nodes for "Task 1-1", "Task 1-2", "Task 1-3", and "Task 1-4."

This illustration shows a previously-selected affordance 118 associated with the node for "Task 1-2." Thus, the affordance 118 visual element (i.e., triangle) has been changed (i.e., rotated approximately 45 degrees) to show this selection, though such modifications are not performed in all embodiments.

Previous to the selection of the affordance 118, the additional "child" data 604 nodes were not displayed; only the "parent" data 602 node for "Task 1-2" was displayed. Thus, upon the selection of the affordance 118 of the node for "Task 1-2", an expand selection event 150 was triggered, which may or may not have been routed through a view module 120, and ultimately received by a datasource module 122. The expand selection event 150 may have included a row identifier (or identifier of the associated node) of the "parent" data node 602, allowing the datasource module to retrieve the additional "child" data 604 from a data store, and generate an insert change event 152 based upon this data.

The insert change event 152 was sent to a view module 120, which received and parsed the insert change event 152 data, and caused the view 114 to be modified by adding two rows of the additional "child" data 604. In some embodiments, this may be performed asynchronously, so the end user could continue interacting with the view 114 (and possibly utilizing the view module 120) to perform other operations with the view 114 while awaiting the update of the view 114 responsive to the selection of the affordance 118.

Figure 7:
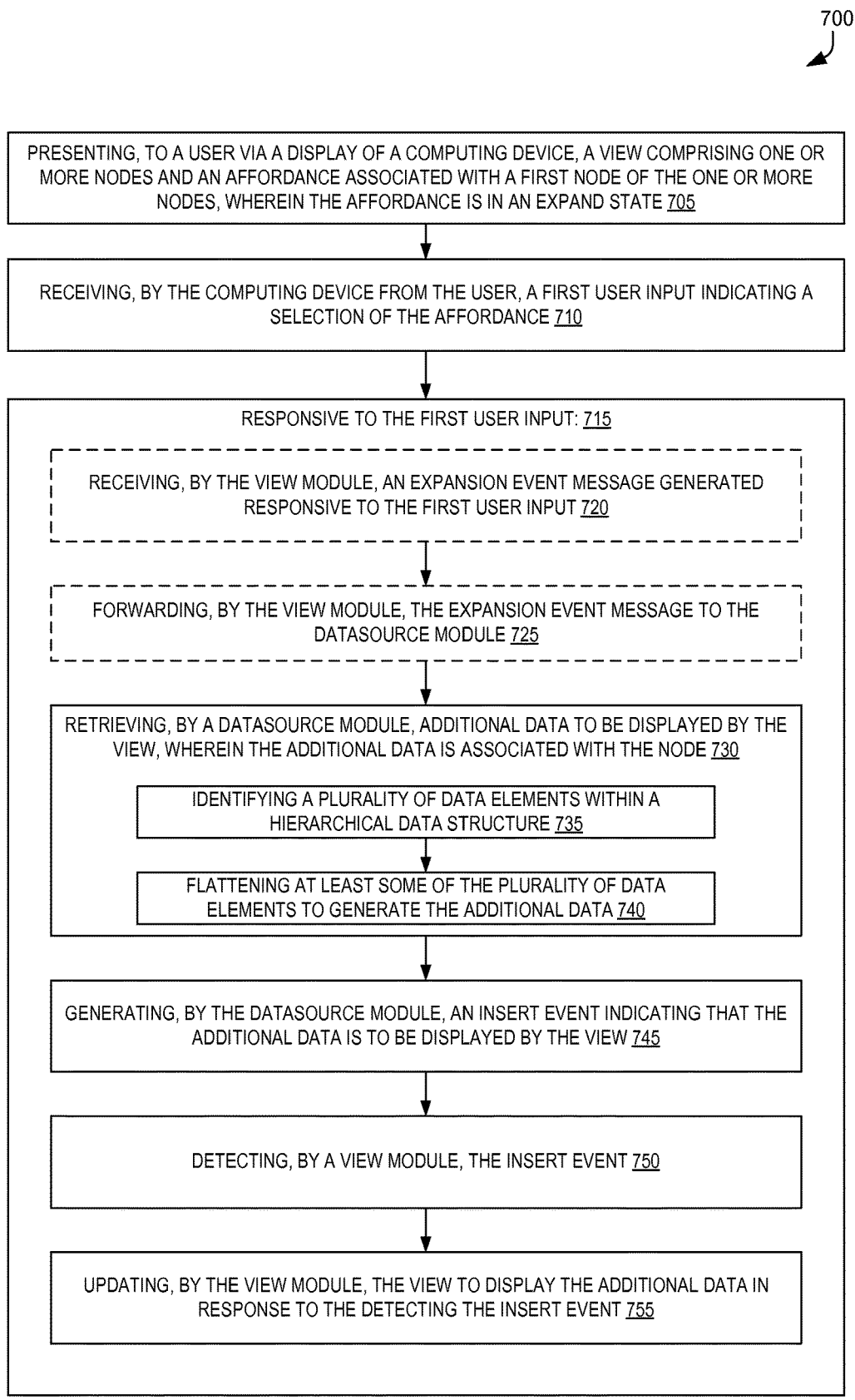
FIG. 7 illustrates a flow in a computing device employing an event-based architecture for expand-collapse operations according to some embodiments.

FIG. 7 illustrates a flow 700 in a computing device employing an event-based architecture for expand-collapse operations according to some embodiments. In some embodiments, the flow of FIG. 7 is performed by the computing device 404 of FIG. 4 or FIG. 5. However, in some embodiments, some portions of the flow of FIG. 7 may be performed by the computing device 404 and some portions may be performed by the server device(s) 418.

The flow 700 includes, at block 705, presenting, to a user via a display of the computing device, a view. The view includes one or more nodes and an affordance associated with a first node of the one or more nodes. The affordance is in an "expand" state.

The flow 700 also includes, at block 710, receiving, by the computing device from the user, a first user input indicating a selection of the affordance. The flow 700 also includes, at block 715, a set of operations performed in response to the first user input.

Optionally, the set of operations includes block 720, in which the view module receives an expansion event message generated responsive to the first user input, and block 725, in which the view module forwards the expansion event message to the datasource module. These operations may be viewed as part of a "pass-through" configuration as described above.

In the depicted flow 700, the set of operations includes block 730, in which a datasource module retrieves additional data to be displayed by the view. The additional data is associated with the node. The additional data may include "child data" of a "parent" in the data structure, where the parent is associated with the node. In some embodiments, this retrieving includes identifying 735 a plurality of data elements within a hierarchical data structure, and flattening 740 at least some of the plurality of elements (e.g., into a flat data structure such as a text "string") to generate the additional data.

The set of operations performed responsive to the first user input also includes generating 745, by the datasource module, an insert event indicating that the additional data is to be displayed by the view, and detecting 750, by a view module, the insert event.

The depicted flow 700 also includes, as part of the set of operations, updating 755, by the view module, the view to display the additional data in response to the detecting the insert event.

Figure 8:
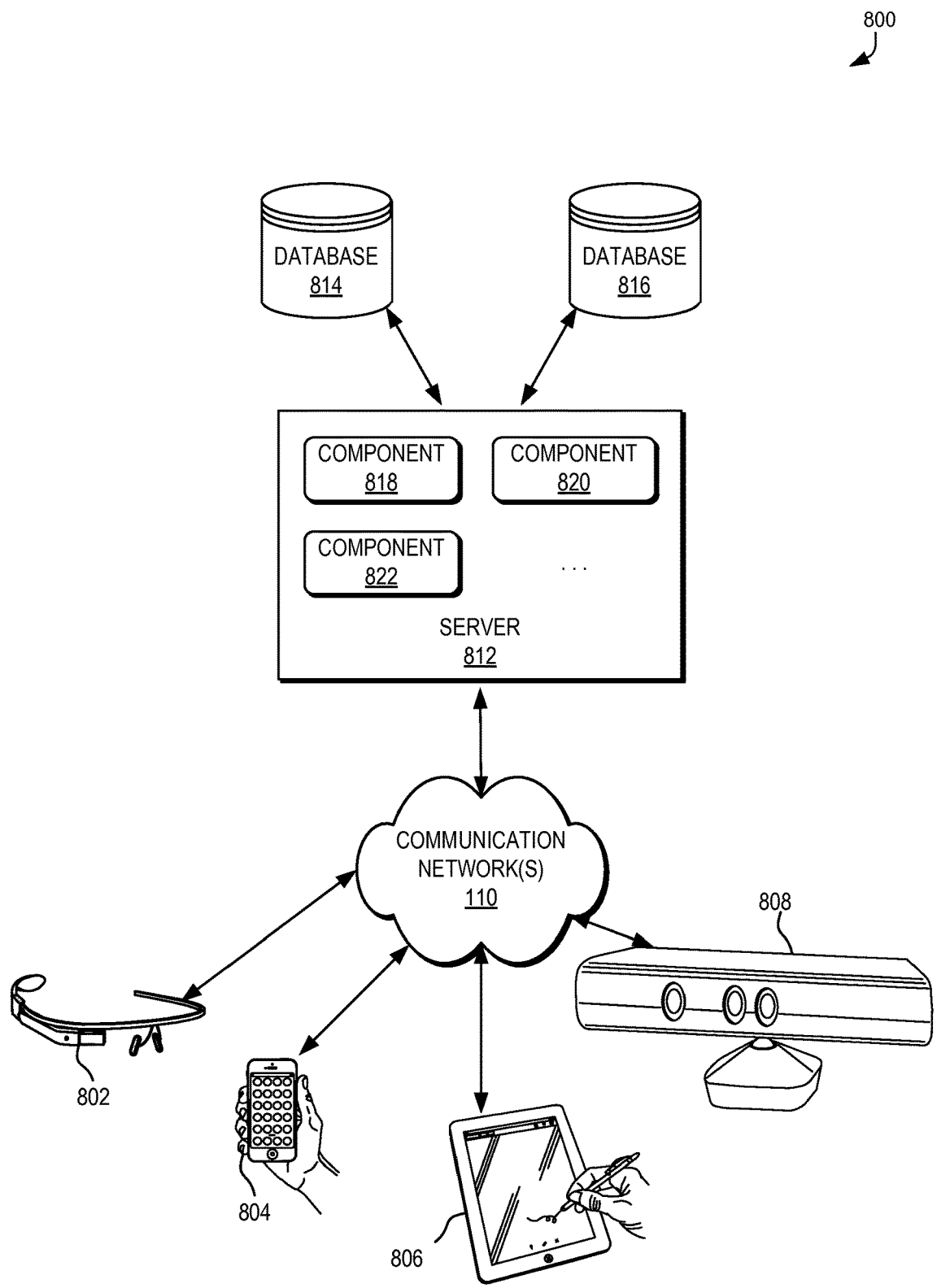
FIG. 8 illustrates a simplified diagram of a distributed system for implementing some embodiments.

FIG. 8 illustrates a simplified diagram of a distributed system for implementing some embodiments. In the illustrated embodiment, distributed system 850 includes one or more client computing devices 802, 804, 806, and 808 (e.g., examples of computing device 404), which are configured to execute and operate a client application (e.g., application 402) such as a web browser, proprietary client (e.g., Oracle Forms), or the like over one or more network(s) 110. Server 812 may be communicatively coupled with remote client computing devices 802, 804, 806, and 808 via communication network(s) 110.

In various embodiments, server 812 may be adapted to run one or more services or software applications such as services and applications that provide code and/or data for an application utilizing an event-based architecture for expand-collapse operations. In certain embodiments, server 812 may also provide other services or software applications that can include non-virtual and virtual environments. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

Client computing devices 802, 804, 806, and/or 808 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 800 in FIG. 8 is shown with four client computing devices, any number of client computing devices may be supported. Other devices, such as devices with sensors, etc., may interact with server 812.

Communication network(s) 110 in distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing as described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. These databases may provide a mechanism for storing information such as user interactions information, usage patterns information, adaptation rules information, and other information used by embodiments of the present invention. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands. However, databases 814 and 816 may provide relational databases, object-oriented databases, object-relational databases, NoSQL databases, etc., and may or may not be SQL-based. For example, databases 814 and/or 816 may be Oracle Database, PostgreSQL, Microsoft SQL Server, MySQL, MemSQL, Memcached, Redis, MongoDB, BigTable, Cassandra, DB2, Solr, etc.

Figure 9:
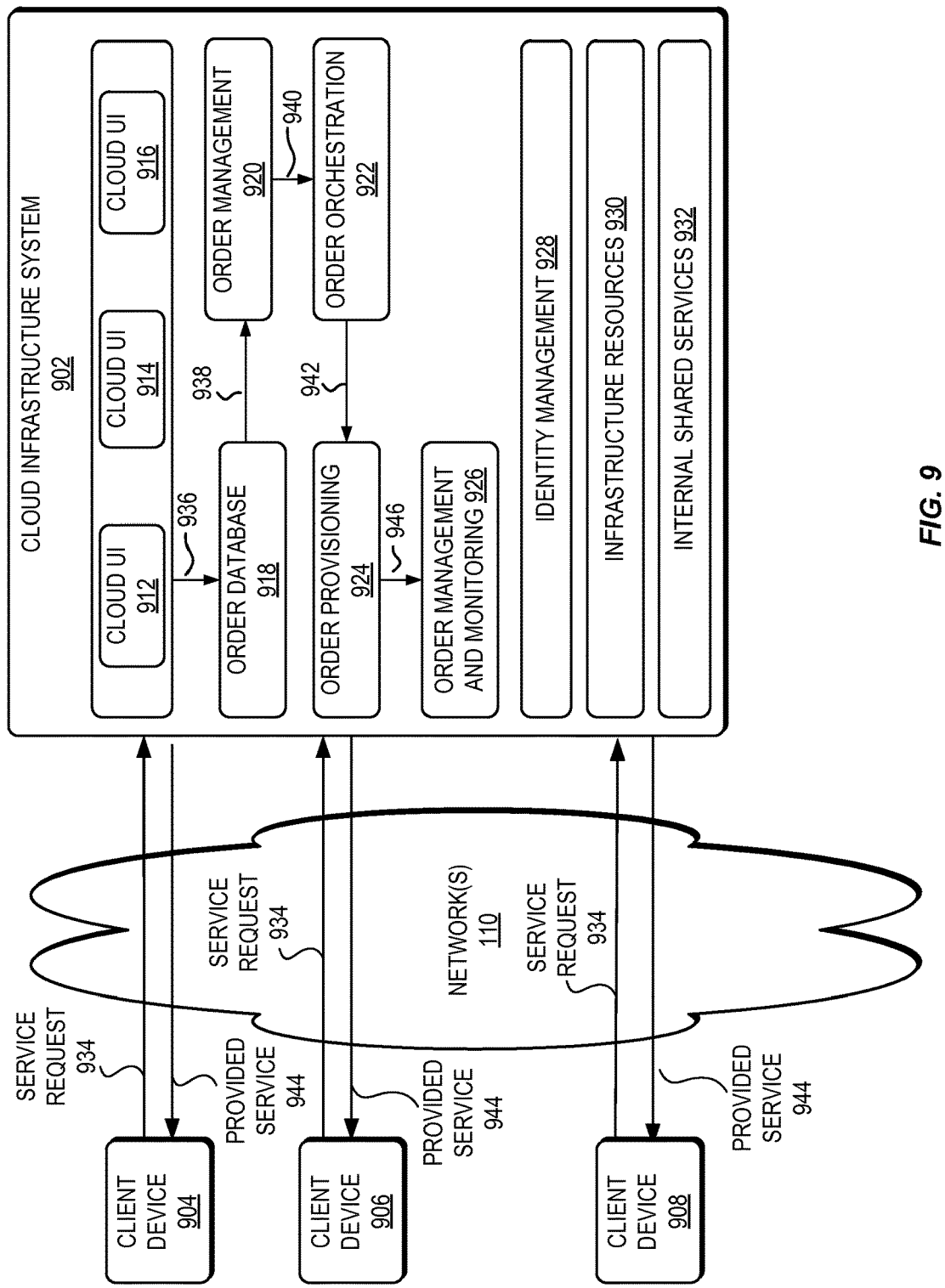
FIG. 9 is a simplified block diagram of one or more components of a system environment in which services may be offered as cloud services, in accordance with some embodiments.

In some embodiments, code and/or data for an application utilizing an event-based architecture for expand-collapse operations may be offered as services via a cloud environment. FIG. 9 is a simplified block diagram of one or more components of a system environment 900 in which services may be offered as cloud services, in accordance with some embodiments. In the illustrated embodiment in FIG. 9, system environment 900 includes one or more client computing devices 904, 906, and 908 that may be used by users to interact with a cloud infrastructure system 902 that provides cloud services. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Communication network(s) 110 may facilitate communications and exchange of data between clients 904, 906, and 908 and cloud infrastructure system 902. Each network may be any type of network familiar to those skilled in the art that can support data communications using any of a variety of commercially-available protocols, including those described above for communication network(s) 110.

In certain embodiments, services provided by cloud infrastructure system 902 may include a host of services that are made available to users of the cloud infrastructure system on demand. In addition to services related to providing code and/or data for an application utilizing an event-based architecture for expand-collapse operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 922 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
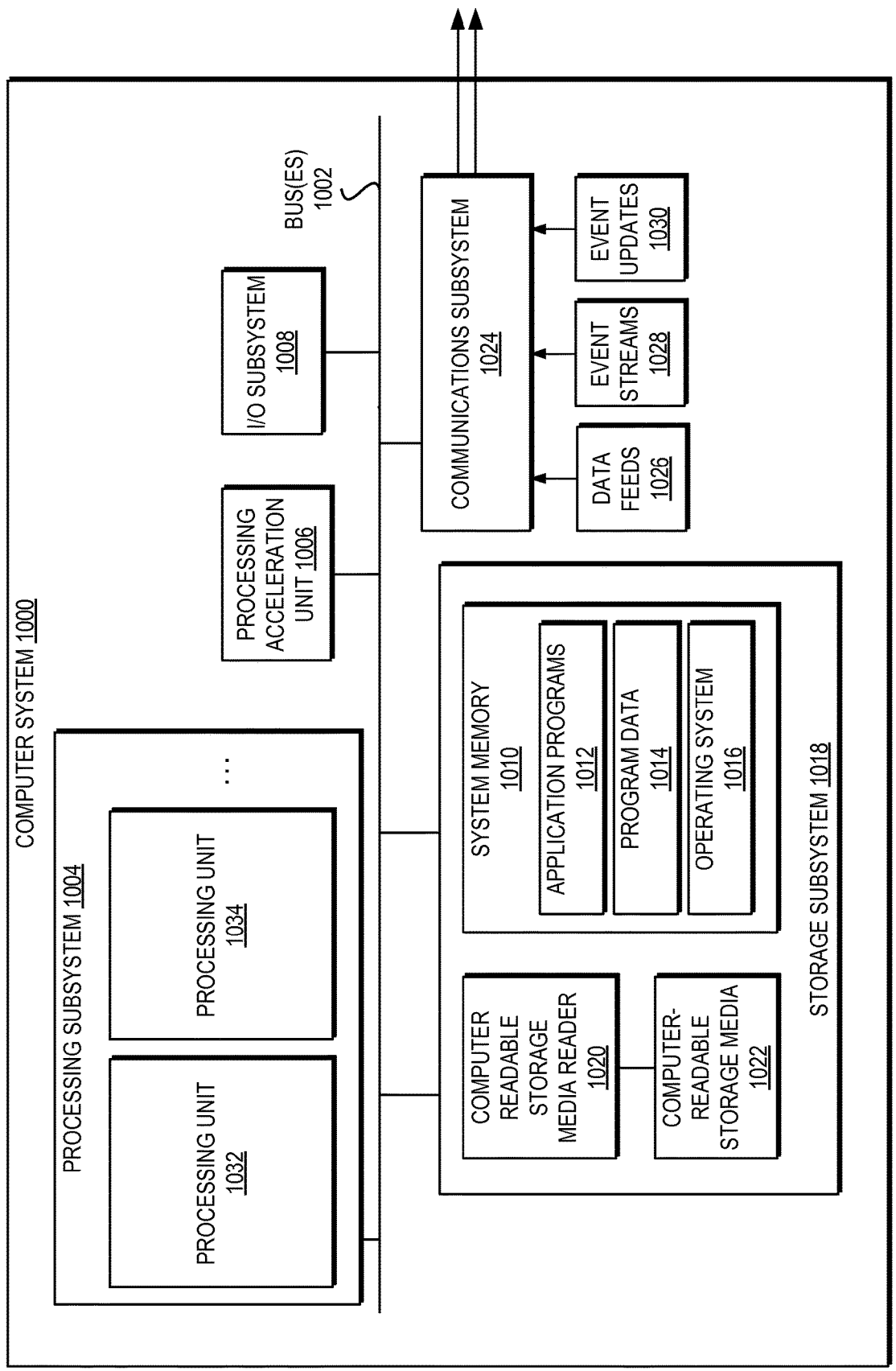
FIG. 10 illustrates an exemplary computer system that may be used to implement certain components according to some embodiments.

FIG. 10 illustrates an exemplary computer system 1000 that may be used to implement certain components according to some embodiments. In some embodiments, computer system 1000 may be used to implement any of the various servers and computer systems described above. As shown in FIG. 10, computer system 1000 includes various subsystems including a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors (GPUs), digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above for an application utilizing an event-based architecture for expand-collapse operations.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method performed by a client device, comprising:
implementing, by the client device, an architecture, comprising a datasource module configured to manage and communicate data of an application being executed by the client device, and a view module configured to present the data of the application;
presenting, by the view module and to a user via a display of the client device, a view comprising one or more nodes corresponding to the data and an affordance associated with a first node of the one or more nodes, wherein the affordance comprises a row expander and instructions associated with a selection event, wherein the view is generated by the view module of the application, and wherein the view module receives the selection event, and passes the selection event including information identifying the datasource module among a plurality of sources to the datasource module substantially unchanged based at least in part on the information;
receiving, at an input-output interface of the client device from the user, a first user input indicating a selection of the affordance;
and
responsive to the selection of the affordance:
identifying an identifier of a row of a grid in which an expand operation associated with the row expander is to occur;
passing the selection event corresponding to the selection of the affordance and including an event type corresponding to the selection event and the identifier of the row to the datasource module, the identifier generated based at least in part on the instructions associated with the selection event;
retrieving, by the datasource module of the application from a data store, additional data to be displayed by the view, wherein the additional data is associated with the row identified by the identifier;
generating, by the datasource module, an insert event comprising the additional data and indicating that the additional data is to be displayed by the view;
detecting, by the view module, the insert event; and
updating, by the view module, the view to display the additional data included in the insert event as an expanded row in response to the detecting of the insert event.

2. The method of claim 1, further comprising:
receiving, by the computing device from the user, a second user input indicating another selection of the affordance; and
responsive to the second user input:
generating, by the datasource module, a delete event indicating that the additional data that is displayed by the view is to be removed, the delete event including a target location identifier specifying a user interface element to be removed from the view;
detecting, by the view module, the delete event; and
updating, by the view module, the view to remove the additional data from the view in response to the detecting the delete event.

3. The method of claim 1, wherein the expand operation and the selection event include an indentation level identifier that indicates a display offset for the additional data.

4. The method of claim 1, wherein the retrieving the additional data by the datasource module comprises:
identifying a plurality of data elements within a hierarchical data structure; and
flattening at least some of the plurality of data elements to generate the additional data.

5. The method of claim 1, wherein:
the insert event from the datasource is asynchronous; and
after passing the selection event and until detecting the asynchronous insert event, the view module passes control to the application in a non-blocking manner.

6. The method of claim 1, wherein detecting, by the view module, the insert event further comprises registering, by the view module, as a listener for data events from the datasource module.

7. The method of claim 1, wherein detecting, by the view module, the insert event further comprises checking, by the view module, an event log.

8. A non-transitory computer readable storage medium storing instructions which, when executed by one or more processors of a client device, cause the client device to perform operations comprising:
implementing an architecture, comprising a datasource module configured to manage and communicate data of an application being executed by the client device, and a view module configured to present the data of the application;
presenting, by the view module and to a user via a display of the client device, a view comprising one or more nodes corresponding to the data and an affordance associated with a first node of the one or more nodes, wherein the affordance comprises a row expander and instructions associated with a selection event, wherein the view is generated by the view module of the application, and wherein the view module receives the selection event, and passes the selection event including information identifying the datasource module among a plurality of sources to the datasource module substantially unchanged based at least in part on the information;

receiving, from the user of the client device, a first user input indicating a selection of the affordance; and responsive to the selection of the affordance:
identifying an identifier of a row of a grid in which an expand operation associated with the row expander is to occur;
passing the selection event corresponding to the selection of the affordance and including an event type corresponding to the selection event and the identifier of the row to the datasource module, the identifier generated based at least in part on the instructions associated with the selection event;
retrieving, by the datasource module of the application from a data store, additional data to be displayed by the view, wherein the additional data is associated with the row identified by the identifier;
generating, by the datasource module, an insert event comprising the additional data and indicating that the additional data is to be displayed by the view;
detecting, by the view module, the insert event; and
updating, by the view module, the view to display the additional data included in the insert event as an expanded row in response to the detecting of the insert event.

9. The non-transitory computer readable storage medium of claim 8, wherein the operations further comprise:
receiving, by the computing device from the user, a second user input indicating another selection of the affordance; and
responsive to the second user input:
generating, by the datasource module, a delete event indicating that the additional data that is displayed by the view is to be removed, the delete event including a target location identifier specifying a user interface element to be removed from the view;
detecting, by the view module, the delete event; and
updating, by the view module, the view to remove the additional data from the view in response to the detecting the delete event.

10. The non-transitory computer readable storage medium of claim 8, wherein the expand operation and the selection event include an indentation level identifier that indicates a display offset for the additional data.

11. The non-transitory computer readable storage medium of claim 8, wherein the retrieving the additional data by the datasource module comprises:
identifying a plurality of data elements within a hierarchical data structure; and
flattening at least some of the plurality of data elements to generate the additional data.

12. A client device, comprising:
one or more processors;
one or more network interfaces communicatively coupled with the one or more processors; and
a non-transitory computer readable storage medium communicatively coupled with the one or more processors storing instructions which, when executed by the one or more processors, cause the client device to perform operations comprising:
implementing an architecture, comprising a datasource module configured to manage and communicate data of an application being executed by the client device, and a view module configured to present the data of the application;
presenting, by the view module and to a user via a display of the client device, a view comprising one or more nodes corresponding to the data and an affordance associated with a first node of the one or more nodes, wherein the affordance comprises a row expander and instructions associated with a selection event, wherein the view is generated by the view module of the application, and wherein the view module receives the selection event, and passes the selection event including information identifying the datasource module among a plurality of sources to the datasource module substantially unchanged based at least in part on the information;
receiving, from the user of the client device, a first user input indicating a selection of the affordance; and
responsive to the selection of the affordance:
identifying an identifier of a row of a grid in which an expand operation associated with the row expander is to occur;
passing the selection event corresponding to the selection of the affordance and including an event type corresponding to the selection event and the identifier of the row to the datasource module, the identifier generated based at least in part on the instructions associated with the selection event;
retrieving, by the datasource module of the application from a data store, additional data to be displayed by the view, wherein the additional data is associated with the row identified by the identifier;
generating, by the datasource module, an insert event comprising the additional data in JavaScript Object Notation (JSON) format and indicating that the additional data is to be displayed by the view;
detecting, by the view module, the insert event; and
updating, by the view module, the view to display the additional data included in the insert event as an expanded row in response to the detecting of the insert event.

13. The client device of claim 12, wherein the operations further comprise:
receiving, by the computing device from the user, a second user input indicating another selection of the affordance; and
responsive to the second user input:
generating, by the datasource module, a delete event indicating that the additional data that is displayed by the view is to be removed, the delete event including a target location identifier specifying a user interface element to be removed from the view;
detecting, by the view module, the delete event; and
updating, by the view module, the view to remove the additional data from the view in response to the detecting the delete event.

14. The client device of claim 12, wherein the retrieving the additional data by the datasource module comprises:
identifying a plurality of data elements within a hierarchical data structure; and flattening at least some of the plurality of data elements to generate the additional data.

\* \* \* \* \*

UNITED STATES PATENT AND TRADEMARK OFFICE
CERTIFICATE OF CORRECTION

PATENT NO. : 10,712,913 B2
APPLICATION NO. : 14/657688
DATED : July 14, 2020
INVENTOR(S) : Sullivan et al.

Page 1 of 1

It is certified that error appears in the above-identified patent and that said Letters Patent is hereby corrected as shown below:

On the Title Page

Column 1, item (72), under Inventors, Line 4, delete "Hendrick" and insert -- Hendrik --, therefor.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*